United States Patent [19]

Nilsson, Sr.

[11] 4,280,482
[45] Jul. 28, 1981

[54] METHOD AND APPARATUS FOR COLLECTING, INTENSIFYING AND STORING SOLAR ENERGY

[75] Inventor: Jack E. Nilsson, Sr., Easley, S.C.

[73] Assignee: Seige Corporation, Greenville, S.C.

[21] Appl. No.: 57,733

[22] Filed: Jul. 16, 1979

[51] Int. Cl.³ .................................................. F24J 3/02
[52] U.S. Cl. ................................... 126/430; 126/436; 126/438; 126/450; 60/641 A
[58] Field of Search ................ 126/417, 419, 430, 432, 126/436, 437, 438, 439, 440, 449, 451, 452, 901, 400, 450, 435; 60/641, 641 A, 641 AB

[56] References Cited

U.S. PATENT DOCUMENTS

| | | | |
|---|---|---|---|
| 290,851 | 12/1883 | Calner | 126/438 |
| 1,599,481 | 9/1926 | Marcuse | 126/438 |
| 1,661,473 | 3/1928 | Goddard et al. | 126/438 |
| 1,951,403 | 3/1934 | Goddard | 126/440 |
| 4,010,732 | 3/1977 | Sawata et al. | 60/641 X |
| 4,043,315 | 8/1977 | Cooper | 126/440 |
| 4,056,093 | 11/1977 | Barger | 126/440 |
| 4,081,024 | 3/1978 | Rush et al. | 126/436 X |
| 4,083,490 | 4/1978 | Cunningham et al. | 126/419 |
| 4,106,479 | 8/1978 | Rogers | 126/439 |

FOREIGN PATENT DOCUMENTS 472427  12/1950  Italy ......................................... 126/438

*Primary Examiner*—Larry Jones
*Attorney, Agent, or Firm*—Bailey, Dority & Flint

[57] ABSTRACT

A method and apparatus for collecting, intensifying and storing solar energy which includes a hollow spherical vessel having a polished reflective interior surface. A window is provided in the wall of the vessel for allowing concentrated rays from the sun to enter into the interior of the vessel and be absorbed by a solar collector. The collector includes a substantially black (or a selective coating) heat absorbing surface carried by a spherical member which is centrally located within the spherical vessel. Heat absorbing media such as metal shots, are carried within the spherical member and change from a solid state to a liquid state as it absorbs the solar energy. The heat absorbing media cause radiant energy to be radiated radially in a symmetric beam pattern to the reflective vessel wall where the radiation is reflected back to the spherical member. The reflected radiant energy in conjunction with the sun's rays intensify the temperature of the heat absorbing media producing a thermal power supply.

9 Claims, 4 Drawing Figures

METHOD AND APPARATUS FOR COLLECTING, INTENSIFYING AND STORING SOLAR ENERGY

BACKGROUND OF THE INVENTION

The present invention relates to a method and apparatus for storing solar energy and more particularly to a method and apparatus for collecting, intensifying and storing solar energy for subsequent use. Heretofore, energy as a source of power has normally been collected by solar collector panels mounted on structures in open space through which fluid such as air or liquid passes for transferring the collected thermal heat to a storage chamber for subsequent use. These storage beds may take many different configurations and one particular configuration utilized are rock beds that are positioned below the building. One problem with rock beds is that they are not a very efficient means of storing high temperatures. While these storage chambers heretofore utilized may be satisfactory for heating buildings and the like, they would not be satisfactory for operating power plants.

In U.S. Pat. No. 4,056,093 there is disclosed a solar heating unit which includes a double wall boiler having a pair of spaced inner and outer hemispherical walls defining a closed chamber therebetween in which liquid that is to be heated is carried. Solar energy passes through a lens system for heating the liquid.

In U.S. Pat. No. 4,043,315 there is disclosed an omnidirectional solar heater collector having a transparent, spherical outer shell. A spherical inner shell is carried within the outer shell and contains a plurality of light magnifying lens spaced along the periphery thereof. A plurality of heat collecting elements is carried within the inner shell spaced from the magnifying lens so that maximum light and heat intensity focuses upon these elements.

In U.S. Pat. Nos. 1,169,839; 1,661,473; and 1,599,481 there are disclosed other solar heaters and accumulators in which a liquid is heated by the rays of the sun utilizing lens systems and reflecting mirrors.

One problem with the majority of the solar heaters heretofore utilized, is that they do not generate and store temperatures of sufficient intensity for operation of power plants and the like during periods of time of darkness or during inclement weather when clouds and the like reduce the solar rays received by the collector.

SUMMARY OF THE INVENTION

A method and apparatus for collecting, intensifying and storing thermal energy which includes a hollow spherical vessel having an interior wall. A window is provided in the wall of the vessel for allowing concentrated rays from the sun to enter into the interior of the vessel. A spherical container is centrally located within the vessel and has a solar collector carried thereon. The solar collector in one particular embodiment is conically shaped and has a substantially black (or selective coating) surface thereon for receiving and absorbing the rays passing through the window of the spherical vessel. Heat absorbing means in one particular embodiment in the form of metal shots is carried in the spherical container for absorbing and storing the thermal energy collected by the solar collector causing radiant energy to be emitted from the spherical container. A polished reflective surface is carried on the interior wall of the spherical vessel for reflecting the radiant energy back to the spherical container intensifying the temperature of the heat absorbing means.

Normally, the heat absorbing means begins in a solid state and as the intensity of the temperature supplied by the rays from the sun and the reflected radiant energy increases, it is changed from a solid to a liquid state. As a result of the radiant energy being reflected back and forth between the exterior wall of the spherical container and the interior wall of the vessel, the spherical container with the heat absorbing means therein is raised to very high temperatures. Transfer tubes are carried within the spherical container through which a heat transferring fluid passes for removing heat from the molten heat absorbing means for use as a source of thermal power. A vacuum is provided in the space between the external wall of the spherical container and the interior wall of the spherical vessel. A vacuum is also provided in the interior of the spherical container.

Accordingly, it is an important object of the present invention to provide a method and apparatus of producing a high intensity source of thermal power from solar energy.

Another important object of the present invention is to provide an apparatus for collecting, intensifying and storing solar energy which is clean and extremely simple in operation.

Still another important object of the present invention is to provide a power source which utilizes solar energy in combination with reflected radiant energy to produce a high intensity thermal supply.

These and other objects and advantages of the invention will become apparent upon reference to the following specification, attendant claims and drawings.

DESCRIPTION OF A PREFERRED EMBODIMENT

Figure 1:
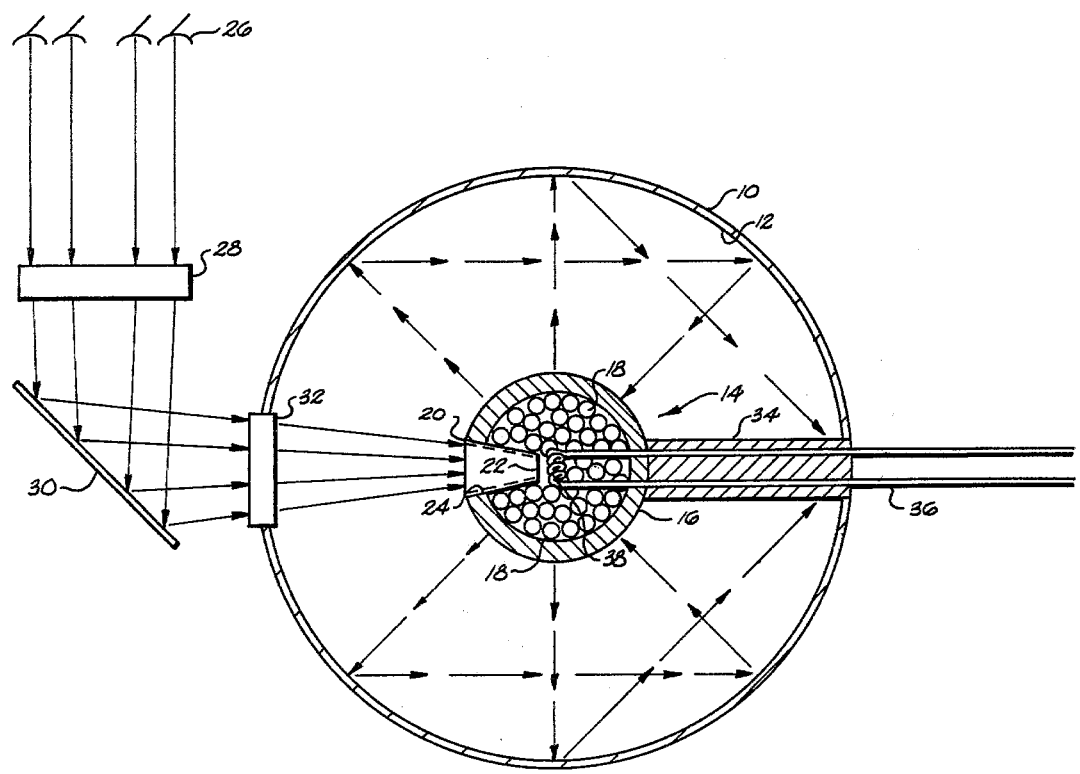
FIG. 1 is a sectional view of a solar power source constructed in accordance with the present invention.
Figure 2:
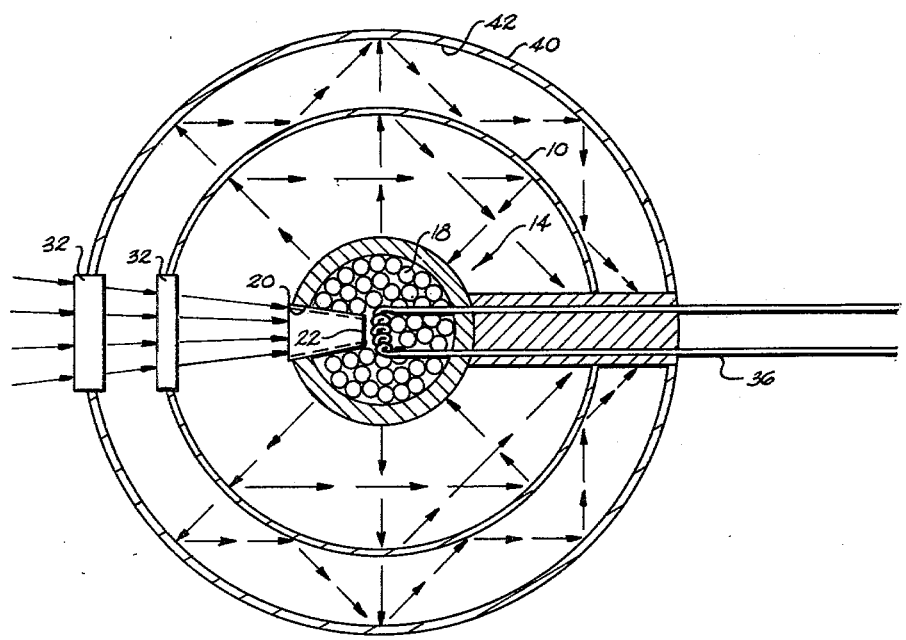
FIG. 2 is a sectional view of a modified form of the invention.

Referring in more detail to the drawings, there is illustrated in FIG. 1 a solar power cell constructed in accordance with the present invention which includes a hollow spherical vessel 10 constructed of any suitable material such as stainless steel that has a reflective polished coating 12 provided on an interior wall thereon. This coating can be any suitable highly reflective surface such as polished stainless steel or a mirror surface.

Carried within the spherical vessel 10 is solar collector generally designated by the reference character 14, that will be referred to hereinafter as an emitter. The emitter includes a spherical member 16 that is filled with heat absorbing material 18. Adjacent one side of the spherical member 16 and extending into the interior thereof is a conical shaped member 20 (or other desirable geometric shape) that has a closed bottom 22 adjacent the small diameter end thereof and an open end adjacent the large diameter end thereof. The interior wall 24 of the conical shaped member is coated with a substantially black (or selective surface) heat absorbing surface 24 which is provided for receiving and absorbing thermal energy.

The rays from the sun are directed by converging mirrors 26 through an iris assembly 28 which can be opened and closed for controlling the flow of rays therethrough. A secondary mirror 30 reflects the concentrated rays of sunlight through an optical window 32 provided in the wall 10 of the spherical vessel. As the rays enter into the spherical vessel 10 they strike the black solar collecting surface 24 carried on the interior of the conical shaped member which absorbs the thermal energy therefrom. This thermal energy is then transferred by means of conduction to the heat absorbing material 18 carried within the spherical container 16. The heat absorbing material may be in the form of metal shots which would become molten when the system is operational. Material such as aluminum, copper, brass bronze and other suitable metals would provide good stability, be non-stratifying and possess good latent heat content characteristics.

The spherical container 16 has a low emissivity value and is placed in or near the center of the interior of the spherical vessel and it is supported on a post 34. This post assembly 34 has passages extending therethrough through which tubes 36 extend from outside of the spherical vessel 10 to the interior of the spherical container 16 providing communication with a coil or other transfer tube configurations 38 that are carried within the container. Fluid flows through the tubes 36 and the transfer tubes 38 for transferring the stored thermal energy collected by the heat absorbing media 18 externally of the spherical vessel 10. The post 34 can be constructed of any suitable material that is a poor conductor of heat so as to minimize the loss of thermal energy from the emitter outside of the spherical vessel. One suitable material is marionite.

In operation, the rays of the sun are focused by the mirror system through the optical window 32 to the substantially black collective surface 24 of the conical member 20. The metallic heat absorbing material 18 absorbs thermal energy from the conical shaped member 20. As it absorbs the thermal energy it radiates radiant energy radially outwardly therefrom as shown by the broken arrows. This radiant energy is reflected back by the mirror surface 12 carried on the interior of the spherical vessel. As a result of the reflected radiant energy and the incoming solar energy passing through the window 32, the two sources of energy work in unison intensifying the temperature of the heat absorbing material 18 producing an intense source of thermal energy. In order to minimize heat losses, a vacuum is provided in the space between the emitter 14 and the interior wall of the spherical vessel 10. The interior of the emitter is also evacuated of air.

Any suitable optical system can be utilized for concentrating the rays of sun and focusing them on the collective surface 20. It has been found that parabolic mirrors can be positioned for concentrating the sun's rays and directing them through the iris assembly. The purpose of the iris assembly is to regulate the amount of concentrated rays that are supplied to the interior of the spherical vessel.

The spherical vessel as previously mentioned, may be constructed of any suitable material such as stainless steel, and as a result of being spherical in shape there is a high volume to surface ratio which minimizes heat losses to the outside and it also tends to naturally focus reflective patterns of radiant heat to the center thereof for striking the emitter surface.

There are many suitable surface coatings 12 that can be utilized having satisfactory reflecting properties and in one particular embodiment a silver coating is utilized. However, it is to be understood that other coatings such as aluminum, gold, copper, rodium and platinum reflective coatings could also be utilized. Silicon monoxide coated over the silver will protect the reflective surface from the severe thermal environment encountered within the spherical vessel 10. To minimize heat losses, the exterior of the vessel is polished or coated producing a reflective surface.

In one particular embodiment, the coating on the interior of the conical member 20 is carbon, however, other suitable low emissivity type material such as pyrolytic graphite can be utilized for absorbing thermal energy. The fluid heat transfer media that flows through the tubes 36 and the coil 38 may also be any suitable material such as Dowtherm, Therminol, liquid sodium, carbon dioxide, high pressure water, etc.

In order to increase the efficiency of storing thermal energy in the solar cell, the spherical vessel 10 can be concentrically located within another spherical vessel 40. The interior wall 42 of the spherical vessel 40 has a reflective coating similar to the reflective coating 12 provided on the interior wall of the spherical vessel 10 for reflecting the radiant energy back towards the emitter 14 as shown by the broken lines and arrows. A vacuum is also provided between the external surface of the vessel 10 and the interior surface of the spherical vessel 40. Like reference numerals are used for the same and similar elements. Multiple spherical vessels may also be utilized.

Figure 4:
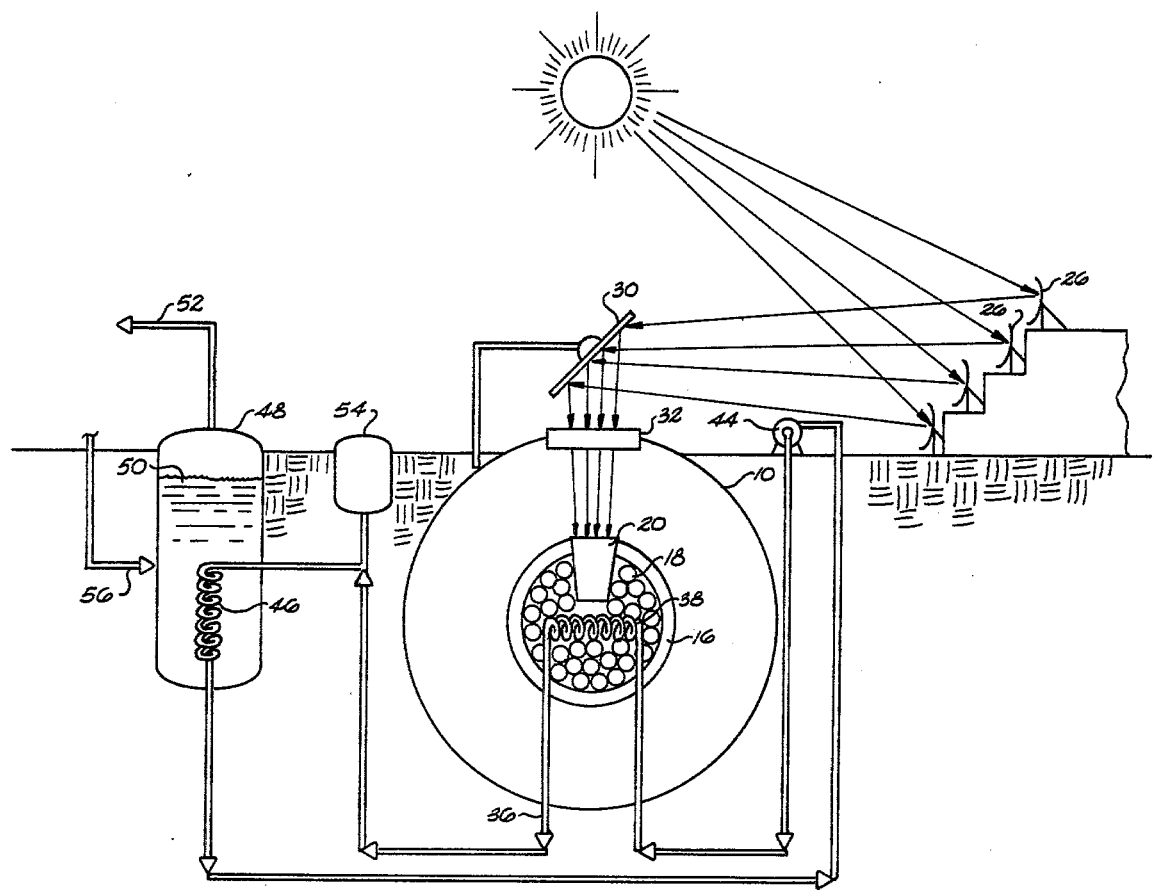
FIG. 4 is a schematic illustration showing a solar cell constructed in accordance with the present invention being utilized in an industrial application such as a major power generation plant.

In FIG. 4, the solar cell is illustrated as being utilized for heating water or generating steam in a tank for home consumption and industrial use. The solar cell can be relatively small when being used for heating water.

The heat transfer media is pumped through the tubes 36 by means of a pump 44. As the fulid passes through the coils 38 it absorbs thermal energy from the molten metal 18 and is conveyed through tubes to a coil 46 provided in a steam generating tank 48. As the heat transfer media is fed through the coil 46 it causes water 50 carried therein to boil to generate steam that is exhausted out pipe 52. The heat transfer media is carried within a closed tubular system extending between the pump 44 and the tank 48. A reservoir 54 is provided for supplying the heat transfer media to the tubes 36. Makeup water is supplied through tube 56 to the steam generating tank 48.

Figure 3:
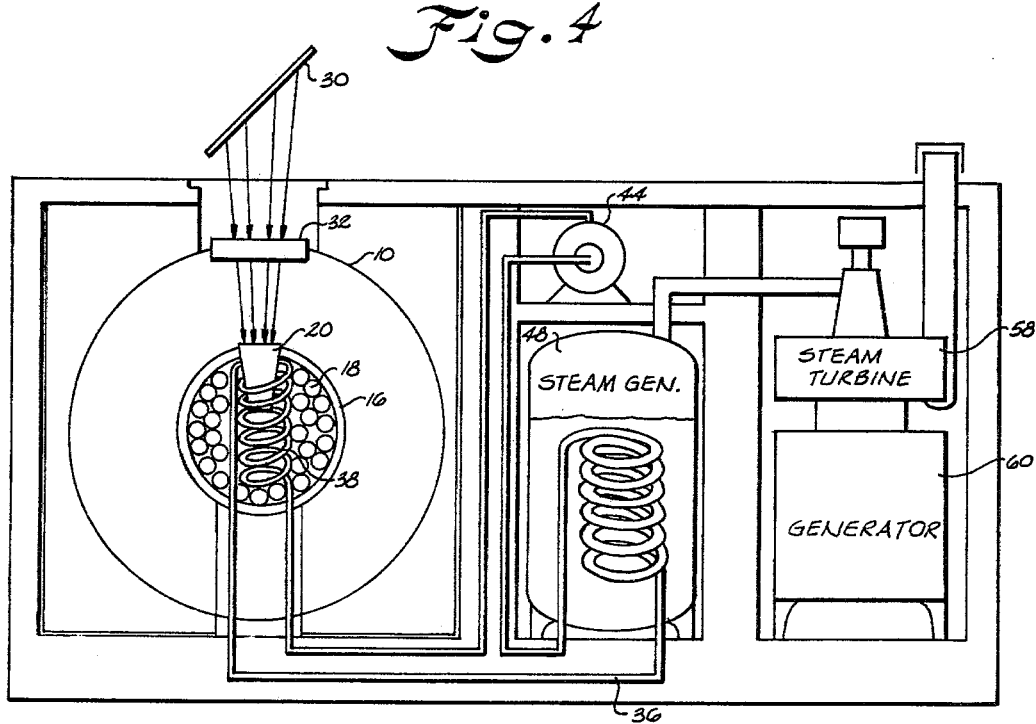
FIG. 3 is a schematic illustration showing a solar cell constructed in accordance with the present invention being utilized for heating hot water and/or steam for residential or industrial use.

In FIG. 4, the solar cell is shown in an industrial application wherein the heat transfer media is fed through the tubes 36 to a steam generating tank 48. The output of the steam generating tank is, in turn, fed directly to a steam turbine 58 which drives a generator 60 for generating electrical power. Of course, it is to be understood that the solar cell could be utilized in many different industrial applications and the application shown in FIGS. 3 and 4 are examples of such use. The entire assembly such as illustrated in FIG. 4 can be located underground so as to minimize thermal losses, or it can be carried within a concrete housing as illustrated in FIG. 3.

Energy can be removed from the molten metal 18 in other forms than thermal. For example, a thermocouple or thermonic generator can convert thermal energy to electrical energy for removal.

While a preferred embodiment of the invention has been described using specific terms, such description is for illustrative purposes only, and it is to be understood that changes and variations may be made without departing from the spirit or scope of the following claims.

What is claimed is:

1. An apparatus for collecting, intensifying and storing solar energy comprising:
   a hollow spherical vessel having an interior wall;
   a window provided in said wall of said vessel for allowing concentrated rays from the sun to enter into the interior of said vessel;
   a solar collector centrally carried in said spherical vessel, said solar collector having;
   (i) a spherically shaped wall,
   (ii) a substantially black collector surface for absorbing thermal energy from said concentrated rays, and
   (iii) a heat absorbing means carried in said container for absorbing and storing thermal energy from said collector surface, and for causing radiant energy to be emitted, said heat absorbing means being a material which goes from a solid state to a liquid state upon absorbing thermal energy from said heat collector surface,
   a polished reflective surface carried on an interior wall of said spherical vessel for reflecting said radiant energy emitted by said heat absorbing means back to said spherically shaped wall of said solar collector.

2. The apparatus as set forth in claim 1 further comprising:
   a conical shaped member having a large diameter end and a small diameter end extending into said solar collector through said spherically shaped wall;
   a bottom carried on said small diameter end of said conical shaped member;
   said large diameter end of said conical shaped member facing said window so that said rays from said sun enter said conical shaped member; and
   a substantially black heat absorbing surface being carried on an inner surface of said conical shaped member.

3. The apparatus as set forth in claim 1 further comprising:
   said spherical vessel and said spherically shaped wall of said collector being sealed; and
   a substantial vacuum provided in the space between said solar collector and said interior wall of said spherical vessel.

4. The apparatus as set forth in claim 1 further comprising:
   heat transfer means extending from outside of said spherically shaped vessel through said heat absorbing means for transferring thermal energy from said heat absorbing means externally of said spherically shaped vessel.

5. An apparatus for collecting, intensifying or sustaining and storing solar energy comprising:
   a hollow spherical vessel having an interior wall;
   a window provided in said wall of said vessel for allowing concentrated rays from the sun to enter into the interior of said vessel;
   a solar collector carried adjacent the center of said spherical vessel spaced from the interior walls of said spherical vessel, said solar collector including;
   (i) a container,
   (ii) a substantially black heat absorbing surface carried by said container for being contacted by said rays passing through said window,
   (iii) heat absorbing means carried in said container for absorbing and storing thermal energy from said heat absorbing surface and for heating said container causing radiant energy to be emitted from said container, and
   (iv) said heat absorbing means being metal that goes from a solid state to a liquid state upon absorbing thermal energy from said substantially black heat absorbing surface,
   a polished reflective surface carried on an interior wall of said spherical vessel for reflecting radiant energy back to said container intensifying the temperature of said heat absorbing means.

6. The apparatus as set forth in claim 5 further comprising:
   said container is a spherical member which is centrally carried within said hollow vessel.

7. The apparatus as set forth in claim 6 further comprising:
   a conical shaped member having a large diameter end and a small diameter end extending into said spherical member;
   a bottom carried on said small diameter end of said conical shaped member;
   said large diameter end of said conical shaped member facing said window so that said rays from the sun enter said conical shaped member; and
   said substantially black heat absorbing surface being carried on interior walls of said conical shaped member.

8. The apparatus as set forth in claim 5 further comprising:
   said hollow vessel and said container being sealed; and
   a substantial vacuum provided in the space between said container and said interior wall of said hollow vessel.

9. A method of collecting, intensifying and storing solar energy comprising:
   concentrating and directing rays from the sun through a window of a sealed spherical vessel;
   absorbing thermal energy from said rays with a collector;
   accumulating and storing said thermal energy absorbed by said collector with a heat absorbing member centrally located in said spherical vessel causing said heat absorbing member to emit radiant energy and causing said heat absorbing member to change from a solid state to a liquid state as it absorbs thermal energy;
   reflecting said radiant energy emitted by said heat absorbing member with a reflective surface carried on an interior wall of said spherical vessel back to said heat absorbing member; and
   externally removing thermal energy from said heat absorbing member with a heat transfer means from said spherical vessel providing a source of thermal power.

* * * * *